United States Patent [19]

Helms et al.

[11] Patent Number: 5,337,184

[45] Date of Patent: Aug. 9, 1994

[54] ACRYLIC THERMOPLASTIC IONIC CONDUCTOR

[75] Inventors: Jeffrey H. Helms, Plymouth; Joseph W. Holubka, Livonia, both of Mich.; Edmund J. Blais, Windsor, Canada

[73] Assignee: Ford Motor Company, Dearborn, Mich.

[21] Appl. No.: 1,689

[22] Filed: Jan. 7, 1993

[51] Int. Cl.$^5$ .......................... G02F 1/01; C08J 3/00; C08K 3/30; C08L 39/00

[52] U.S. Cl. ................................. 359/270; 524/423; 524/555; 525/123; 525/127; 525/455; 526/301

[58] Field of Search ................ 525/123, 127, 455; 359/270; 524/423, 555; 526/301

[56] References Cited

U.S. PATENT DOCUMENTS

| | | |
|---|---|---|
| 4,730,021 | 3/1988 | Zom et al. |
| 4,807,977 | 2/1989 | Sammells |
| 4,818,780 | 4/1989 | Murray et al. |
| 4,828,369 | 5/1989 | Hotomi |
| 5,045,619 | 9/1991 | Kuroda et al. |

FOREIGN PATENT DOCUMENTS 61-115983  6/1986  Japan .................................. 525/123

OTHER PUBLICATIONS

Poly [Lithium Methacrylate-Co-Oligo (Oxyethylene) Methacrylate] As a Solid Electrolyte with High Ionic Conductivity; Kobayashi, Uchiyama and Tsuchida; Solid State Ionics 17 (1985) 307–311.

Poly [oligo (oxethylene) methacrylate-co-sodium methacrylate] as a Polymeric Solid Electrolyte with Sodium Ionic Conduction; Kobayashi, Hamada, Ohno, and Tsuchida; Polymer Journal, vol. 18, No. 9, pp. 661–666 (1986).

Lithium Ionic Conduction in Poly (Methacrylic Acid-)-Poly (Ethylene Oxide) Complex Containing Lithium Perchlorate; Tsuchida, Ohno and Kobayashi, Solid State Ionics 11 (1983) 227–233.

Highly conductive poly (ethylene oxide)-poly (methyl methacrylate) blends complexed with alkali metal salts; Florianczyk, Such, Wieczorek and Wasiucionek; Polymer, 1991, vol. 32, No. 18.

Ionic conductivity in poly (ethylene oxide) modified poly (dimethylsiloxane complexed with lithium salts; Albinsson and Mellander, and Stevens, Polymer, 1991, vol. 32, No. 15.

Ionic Conductive Polymers Based on Polymethylsiloxane Graft-Crosslinked with Oligo (ethylene oxide), Mei and Okamoto, and Scothelm; Polymers for Advanced Technologies, vol. 1, pp. 239–245.

Synthesis, Polymerization and Cation Conductive Properties of (l-carboxy)-oligo (oxyethylene) Methacrylate; Takeoka, Maeda, and Tsuchida and Ohno; Polymers for Advanced Technologies, vol. 1.

Poly [l-(carboxy) oligo (oxyethylene) methacrylate] as a New Type of Polymeric Solid Electrolyte for Alkali--Metal Ion Transport; Tsuchida, Ohno, Kobayashi, and Ishizaka; Macromolecules 1989, 22, 1771–1775.

Ionic conductivities of poly (methoxy polyethylene glycol monomethacrylate) complexes with LiSO CH ; Bannister, Davies and Ward, McIntyre; Polymer, 1984, vol. 25, Nov.

Conductivities of Solid Polymer Electrolyte Complexes of Alkali Salts with Polymers of Methoxypolyethyleneglycol Methacrylates; Xia, Soltz, and Smid; Solid State Ionics 14 (1984) 221–224.

Primary Examiner—Paul R. Michl
Assistant Examiner—Patrick Niland
Attorney, Agent, or Firm—Lorraine S. Melotik; Roger L. May

[57] ABSTRACT

This invention is directed to a thermoplastic ionic conductor composition comprising a polymeric adduct having an acrylic backbone and polyether side chains, and an alkali metal salt. The polymeric adduct is made by reacting a particularly defined hydroxy-functional acrylic copolymer with polyether monoisocyanate. The composition is useful, e.g., in electrochromic devices as the electrolyte layer.

12 Claims, No Drawings

ACRYLIC THERMOPLASTIC IONIC CONDUCTOR

BACKGROUND OF THE INVENTION

This invention is directed to a thermoplastic composition which is conductive to ions. More particularly, the composition comprises a polymeric adduct and alkali metal salt. The adduct has an acrylic backbone and polyether side chains.

Polymeric solid electrolytes exhibiting high ionic conductivities are excellent materials for commercial devices such as batteries, electrochromic displays, sensors, and capacitors. Liquid electrolytes have conventionally been used in such devices. When conventional liquid electrolytes are employed, e.g., in electrochromic devices, there is a possibility of leakage of the electrolyte and the inherent difficulty of sealing such a device. Thus, although liquid materials perform the required ionic transport function, they are very difficult to handle from a device construction standpoint.

Various solid electrolytes have been suggested for use in electrochromic devices. Solid electrolytes of complex halides are known, particularly iodides of silver with an alkali metal. Additionally, solid electrolytes may comprise aluminum compounds such as sodium beta-alumina and potassium beta-alumina. However, these electrolytes are all typically expensive to prepare and, in the case of the alumina compounds, could not be formed directly on components of an electrochromic device since they require very high processing temperatures. Others have suggested forming a solid electrolyte comprising a sheet of porous glass impregnated with a solid, ion-conductive silver or alkali metal compound. One disadvantage of employing such an impregnated glass sheet is that, because it is a solid of limited flexibility, it would be difficult to assemble the component layers of an electrochromic device and achieve the intimate contact required between this sheet and the adjacent layers.

Such problems are minimized with polymeric electrolytes which are generally either extremely viscous liquids or tacky solids. It would be desirable, however, if the polymeric electrolytes were solids which could be formed into self-supporting films with a degree of flexibility to allow uncomplicated device fabrication. Such solid polymeric electrolyte formulations, if used in an automotive windshield comprising an electrochromic, device might allow compliance with automotive requirements regarding occupant restraint and glass shatter.

One approach to forming such a flexible solid material involves copolymerization of polyethylene oxide and polypropylene oxide and results in systems having good conductivity at room temperature but a markedly reduced ionic conductivity at low temperatures. Another approach to the formation of room temperature flexible solid polymer electrolytes includes forming materials having backbones of phosphazene and siloxane-based polymers with etheric side chains. These materials generally lack appreciable dimensional stability and must be chemically or radiationally cross-linked. In addition, the susceptibility of the Si—O—C bonds to hydrolysis and subsequent structural degradation constitute a severe problem unless moisture can entirely be eliminated.

Yet another approach involves poly (2-methoxy polyethylene glycol monomethacrylates) complexed with a lithium salt of triflic acid having etheric side chains of 9-22 ethylene oxide units. Others have reported similar polymers coplymerized with styrene. Common problems encountered by each of these is the inverse relationship between optimization of the ionic conductivity and simultaneously the mechanical properties. The dependence of ionic conductivity on salt concentration in amorphous materials must also be optimized. Decreasing the salt content, while it desirably reduces crystallinity, also reduces the mechanical strength of the resulting material. In these and similar systems, purification and neutralization steps necessary in processing such materials is very time consuming.

The present invention provides a thermoplastic ionic conductor that overcomes the deficiencies of the foregoing materials in that it shows no high temperature instability regardless of water content, reacts rapidly without phase separation or exclusion of a plasticizer when it is used, and forms tough flexible films via normal casting or extrusion techniques. It is a thermoplastic material able to perform well in an electrochromic-laminated glass system as would be necessary, particularly in automotive applications.

SUMMARY OF THE INVENTION

The invention is directed to a thermoplastic ionic conductor composition comprising an alkali metal salt and a polymeric adduct. The polymeric adduct has an acrylic backbone and polyether side chains and is made by reacting: (A) an hydroxy-functional acrylic copolymer and (B) polyether monoisocyanate, wherein the hydroxy-functional acrylic copolymer and the monoisocyanate are reacted in amounts so as to provide between about 0.5 and 1.0 reactive isocyanate groups per each hydroxyl functionality present on the acrylic copolymer.

The hydroxy-functional acrylic copolymer has a number average molecular weight (Mn) between about 2,000 and 500,000 and a Tg in the range of 0° C. and 100° C. Preferably, the Mn is between 10,000 and 300,000. The hydroxy-functional acrylic copolymer is made by copolymerizing ethylenically unsaturated monomers comprising at least 50% by weight monomers selected from acrylates and methacrylates wherein at least 20% by weight of the ethylenically unsaturated monomers comprise hydroxy-functional ethylenically unsaturated monomers. Preferably the polyether monoisocyanate is made by reacting a diisocyanate with a mono-hydroxy functional polyether, the diisocyanate preferably being isophorone diisocyanate.

According to another embodiment of the invention, it is directed to method of making the disclosed thermoplastic ionic conductor composition. Yet another embodiment of the invention is directed to an electrochromic device comprising two substrates and therebetween: one electrode layer; and ion conductive layer; and electrochromic layer; and another electrode layer. At least one of the one electrode layer and the other electrode layer are transparent and each electrode layer is in contact with a respective one of the substrates. The ion conductive layer is adapted to communicate ions to and from the electrochromic layer upon application of a voltage across the electrode layers. The ion conductive layer of the electrochromic device comprises the thermoplastic ionic conductor composition disclosed above.

DETAILED DESCRIPTION OF PREFERRED EMBODIMENTS

The acrylic thermoplastic ionic conductor composition of the invention as described above comprises a polymeric adduct having an acrylic backbone and polyether side chains. It is made by reacting a hydroxy-functional acrylic copolymer with polyether monoisocyanate. The acrylic copolymer and the monoisocyanate are reacted in amounts so as to provide between about 0.5 and 1.0 reactive isocyanate groups per each hydroxyl functionality present on the acrylic copolymer.

The copolymer is made by copolymerizing ethylenically unsaturated monomers comprising at least 50% by weight monomers selected from acrylates and methacrylates wherein at least about 20% by weight of the ethylenically unsaturated monomers comprise hydroxy-functional ethylenically unsaturated monomers. As is well known to those skilled in the art, copolymers of this type can be prepared by conventional free radical induced polymerization. For example, they can be prepared in solutions of any of a number of organic solvents, such as xylene or methylamyl ketone, the choice depending on the solubility of the resulting polymer. As used herein, the term "copolymer" refers to a copolymer of two or more different monomers at least one of which contains pendent hydroxyl functionality.

This hydroxy-functional copolymer has a number average molecular weight between about 2,000 and 500,000 more preferably between about 10,000 and 300,000. The Mn is largely determined by the mechanical properties of the desired final material. It has a Tg in the range of 0° C. and 100° C., more preferably between about 30° C. and 70° C. The addition of monoisocyanate into the adduct by reaction of the copolymer and polyether monoisocyanate is expected to provide internal plasticization of the parent polymeric adduct and control the overall glass transition temperature and softening point of the product. Thus, the glass transition temperature and softening point of the parent polymer must be high enough that following the addition of the etheric side chains via the monoisocyanate, the resulting polymeric adduct maintains the mechanical properties necessary for, e.g., handling and electrochromic device fabrication.

The ethylenically unsaturated monomers which may be employed in forming the copolymer are acrylates (this term herein including methacrylates) as well as mixtures of acrylates and vinyl hydrocarbons. At least 50% weight of such monomers, preferably at least 80% by weight, are selected from acrylates and methacrylates. Such percentages are meant to include all monomers, including the hydroxy-functional monomers, employed to form the copolymer.

The monoethylenically unsaturated hydroxy-functional monomers useful in the preparation of copolymer and providing the hydroxy functionality to the copolymer are employed in an amount of at least 20% by weight of the monomers, preferably in an amount of at least 30% by weight.

In the absence of a free isocyanate separation step either by distillation or column separation, the functionality of the hydroxy functional acrylic copolymer becomes increasingly important. More highly functional copolymers will form a gel with small amounts of free diisocyanate thus rendering the final material non-thermoplastic. Therefore, the copolymer functionality must be selected as low as possible to avoid gel formation and yet to impart sufficient ionic conductivity and salt solration ability to the final acrylic polyether. These monomers may be selected from a variety hydroxy functional monomers preferably, however, the hydroxy functional monomers are acrylates and/or methacrylates. They may be selected from the group of, but not limited to, the following: 2-hydroxethyl acrylate, 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-menthylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3 dimethyl-3-hydroxybutyl methacrylate; 5,6 dihydroxyhexyl methacrylate; and 7-hydroxyheptyl methacrylate.

Although one of ordinary skill in the art will recognize that many different hydroxy-bearing monomers, including those listed above, could be employed, the preferred hydroxy-functional monomers for use in the copolymer of the invention are $C_5$–$C_7$ hydroxy alkyl acrylates and/or $C_6$–$C_8$ hydroxy alkyl methacrylates.

Preferably the ethylenically unsaturated monomers used to make the copolymer, other than the hydroxy-functional monomers, are acrylic monomers more preferably being $C_5$–$C_{16}$ acrylic monomers, such as those selected from the group comprising methyl methacrylate, butyl methacrylate, ethylmethacrylate, isobornyl methacrylate, 2-ethylhexyl methacrylate, lauryl methacrylate, stearyl methacrylate and the corresponding acrylate adducts. Still other useful acrylic monomers would be apparent to those skilled in the art in view of the present disclosure. Among the monovinyl hydrocarbons suitable for use include such monomers as styrene, acrylic acid, vinyl acetate, vinyl butyral and vinyl alcohol, 1-butene, 1-pentene, 1-hexene, 1-octene, etc. As discussed herein, when such monovinyl hydrocarbons are employed, they constitute less than 50% weight of the copolymer.

In preparing these acrylic copolymers, the hydroxy-functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include such initiators as benzoyl peroxide; lauryl peroxide; acetylcyclohexylsulfonyl peroxide, AIBN, etc. (azoisobutyronitile). The polymerization is preferably carried out in solution using a solvent in which the copolymer is soluble. Included among the suitable solvents are toluene, xylene, dioxane, butanone, butyl acetate, benzene, hydrocarbons, etc. and methyl amyl ketone, etc. If the copolymer is prepared in solution, the solid copolymer can be precipitated by pouring the solution at a slow rate into a nonsolvent for the copolymer such as hexane, octane, or water under suitable agitation conditions or by removing solvent by heating. If the invention compositions employed in a windshield/electrochromic device as the ion-conducting layer the possibility of UV degradation of the layer should be minimized. Therefore, the choice of monomers should be made to minimize the amounts of UV accessible energy levels which lead to reactive functionality and discoloration with repeated and prolonged exposure (i.e., styrene). In addition, end-groups have been shown to result in UV instability in traditional low molecular weight acrylic paint resins prepared in ketonic solvents. These end groups are responsible causing the base polymer to be labile. Hence, preferred solvents are those that do not form photosensitive acrylic polymers. In solution polymerization, the solvent of choice has been xylene although depending upon polymer solubility, minimal amounts of methyl ethyl ketone may be added. The preferred choice of initiators are those that would not generate photosensitive acrylic copolymers.

The copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions. Preferably, the hydroxy-functional acrylic copolymer of the present invention is made by free radical solution copolymerization of monomers selected from the groups comprising hydroxy propylmethacrylate, methyl methacrylate, butyl methacrylate, hydroxy ethyl methacrylate, and hydroxy ethyl acrylate in an organic solvent.

The polyether monoisocyanate used to form the polymeric adduct according to the present invention is one that contains one reactive isocyanate functional group per molecule and contains polyether functionality. The polyether monoisocyanate has the generic structure P—R—I where R can be e.g., an alkyl group, P is a polyether: —(OR)$_x$; and I is a monoisocyanate like R—N—C=0. The polyether portion of the monoisocyanate contains at least three ether moieties, and preferably contain more than three ether moieties in each polyether group. Exemplary of such polyether groups are those derived from propylene oxide or ethylene oxide and containing such moieties as (OCH$_2$ CH$_2$) and (OCH$_2$ CH3CH). This polyether monoisocyanate may contain other functionality such as —S—, —CO$_2$—, and —O—CO$_2$, as long as such functionality does not interfere with the intended hydroxyl group—isocyanate group reaction, including nor causing crosslinking or affecting the thermoplastic nature of the adduct. Exemplary of such polyether monoisocyanates are e.g., the reaction products of isophorone diisocyanate (IPDI) and polyethylene glycol monomethyl ether; and the reaction product of IPDI and polyethylene glycol (amine), generally in a 1:1 molar ratio, with 1:1.25 being preferred. Alternatively, a monomethyl polyether can be reacted with a large excess of non-equivalent functionality diisocyanate to adjust the reaction equilibrium to formation of only monoisocyanate followed by distillation or column separation of free diisocyanate. Reactions involving the reaction of excess monomethyl polyether with the diisocyanate will produce the monoisocyanate and some polyether platicizer due to reaction of two monomethyl ethers with IPDI molecules. Preferably the polyether employed in making the polyether diisocyanate is a mono-hydroxy functional polyether like polyethylene glycol dimethyl ether. Still other polyether monoisocyanates will be apparent to those skilled in the art. As would be appreciated by those skilled in the art in view of the present disclosure, these materials can be reacted in equimolar amounts or with an excess of the polyether and are typically reacted in a solvent such as THF, xylene, or methylene chloride. The polymeric adduct is generally formed by adding the polyether monoisocyanate to a solution of the hydroxy-functional acrylic copolymer in a low boiling solvent and allowed the materials to react for a number of hours; for example, 12 to 24 hours at room temperature. A solid product can then be removed by heating to evaporate the solvent under mild vacuum conditions. The reaction may be catalyzed by the addition of urethane catalyst like dibutyl tindilaurate.

The thermoplastic ionic conductor composition is prepared by an addition of the appropriate alkali metal salt to the polymeric adduct. The salt is incorporated in the composition in an amount preferably of between about 5:1 and 20:1 molar ratio based on the number of moles if etheric oxygen contained in the polyether monoisocyanate intermediate to the total moles is alkali metal ion. While lesser amounts are suitable, the optimal ionic conductivity is imparted to the composition with the preferred amounts. The ionic conductivity of the invention composition should fall in the range of $10^{-3}$ $\Omega^{-1}cm^{-1}$ and $10^{-6}$ $\Omega^{-1}cm^{-1}$ over the operational temperature range. For automotive applications, this range is defined as $-40°$ C. to $120°$ C. Without plasticization, the higher conductivity is usually not attainable. With plasticization, these numbers are common, and the temperature dependence of the conductivity is minimized. Preferably the salt is selected from salts of sodium and lithium, including but not limited to, nitrates, chlorides, chlorates, and sulfates. Exemplary of such materials are lithium perchlorate and lithium trifluoromethane sulfonate. Addition of the salt to the polymer host may be performed by various methods. For example, the polymeric adduct may be dissolved in a solvent and then the appropriate salt added to the solution. Thereafter, the solvent may be removed leaving the thermoplastic ionic conductor. It may be desirable to incorporate a plasticizer into the conductor such as tetraethylene glycol dimethyl ether, polypylene carbonate, tetraethylene glycol di-2-hexyladipate, or other inert, low vapor pressure, alkali metal solrating liquid compatible with the polymeric compound. In those instances where a plasticizer is employed in the composition, the proportion of the plasticizer may be added to the initial reaction mixture before copolymerization and the rest with a polyether monoisocyanate mixture. In such an instance, after the polymerization is complete, the ether substituted monoisocyanate/plasticizer solution can be added and then the entire solution processed for a period of time, for example, overnight at room temperature. Alternately, the thermoplastic polymeric adduct may be ground to form a powder and this powder then milled with a plasticizer/salt solution and extruded at elevated temperatures to form the ionic conductor composition.

As disclosed herein, the ionic conductor composition may be used in such devices as batteries, electrochromic displays, sensors and capacitors. Exemplary of electrochromic devices are those disclosed in U.S. Pat. 5,016,991, which reference is hereby expressly incorporated by reference for such teachings. It comprises two substrates and therebetween: one electrode layer; and ion conductive layer; and electrochromic layer; and another electrode layer, at least one of the one electrode layer and the other electrode layer being transparent and each electrode layer being in contact with a respective one of the substrates, the ion conductive layer being adapted to communicate ions to and from the electrochromic layer upon application of a voltage across the electrode layers. The thermoplastic ionic conductor composition of this invention is employed as the the ionic conductive layer of the electrochromic device.

The ion conductive layer can be made from the invention composition in different ways. For example, all components may be dissolved in a common low boiling solvent such as THF followed by solvent removal under mild conditions (i.e., low heat, moderate vacuum or low heat under a dry inert gas purge). The bulk material is then heated above the flow temperature and cast into the desired shape. According to another way, the polymer component is ground into a powder at low temperature. This powder is then mixed with the salt dissolved in minimal solvent and cast or extruded at elevated temperature. Yet another way involves grinding the polymer component into a powder and mixing it with a plasticizer/salt solution by normal techniques including ball milling or compounding. The resulting mixture is extruded at elevated temperature. Still other methods will be apparent to those skilled in the art in view of the present disclosure.

EXAMPLES

EXAMPLE 1

An acrylic thermoplastic ionic conductor according to an embodiment of the present invention is made in this example. In an oven-dried 1000 ml three-necked round bottom flask equipped with a mechanical stirrer, additional funnel, thermometer, reflux condenser, and nitrogen gas inlet, 300 ml of dried and deaerated xylenes is added. A reaction monomer solution consisting of 20 g butyl methacrylate, 50 g methyl methacrylate, 30 g hydroxypropyl methacrylate, 0.05 g azoisobutyronitile (AIBN), and 200 ml of xylene is added to the addition funnel. 50 ml of this reaction mixture is first added to the pot. Under a nitrogen blanket, the pot solution is heated to 130° C. or near reflux. The remaining reactant solution in the addition funnel is dripped into the refluxing solution at a constant rate sufficient to maintain the elevated temperature with some external heating. The drip rate is approximately 5-10 ml/min. After all of the reactant mixture is added, the solution is stirred at a constant rate at 134°-140° C. for six hours. The copolymer is isolated by removing the xylene in a Hot-Pack ® oven at 120° C. overnight. 10 g of the resulting copolymer is dissolved in dry tetrahydrofuran. The glass transition temperature and softening temperatures as determined by dynamic mechanical thermal analysis (DMTA) are 68° C. and 30° C., respectively The average molecular weight is estimated to be 150,000 or greater based on the total moles monomer and initiator.

The monofunctional isocyanate is prepared by reacting the diisocyanate, isophorone diisocyanate (IPDI) with a monomethyl polyether, polyethylene glycol methyl ether, formula weight 350 g/mol, in a 1:1.25 molar ratio overnight at room temperature in the presence of 60 µl dibutyl tin dilaurate to insure only traces of free diisocyanate. The resultig monoisocyanate is then added to the THF solution of the hydroxy functionalized methacrylic copolymer in an amount to completely react all hydroxy functionality and allowed to react for 12-24 hours at room temperature. Following this reaction, lithium perchlorate is added in an amount which produces a 12:1 etheric oxygen:lithium ion molar ratio and stirred until all of the salt has dissolved. The solution is then cast onto an appropriate substrate and the solvent is then removed by heating under mild vacuum conditions. DMTA data was used to identify the glass transition temperature and softening point of the resulting electrolyte. $T_g$ is estimated to be 20° C. with a softening temperature of $-10°$ C.

The ionic conductivity of the thermoplastic polymer electrolyte is shown by temperature dependent AC impedance measurements to decrease from $8 \times 10^{-3}$ $\Omega^{-1}\text{cm}^{-1}$ at 120° C. to $1 \times 10^{-6}$ $\Omega^{-}\text{cm}^{-1}$ at room temperature. Increasing the conductivity is achieved by plasticizing the methacrylic polyether copolymer with tetraethylene glycol dimethyl ether at 40% by weight plasticizer. The resulting material exhibits an increase in conductivity to $1 \times 10^{-3}$ $\Omega^{-1}\text{cm}^{-1}$ at 120° C. and $1 \times 10^{-5}$ $\Omega^{-1}\text{cm}^{1}$ at 0° C.

EXAMPLE 2

A reaction flask is assembled as in Example 1. 50 g methyl methacrylate, 50 g hydroxypropyl methacrylate, and 0.5 g AIBN are added to a 300 ml portion of a deaerated mixture of 400 ml xylenes and 100 ml methyl ethyl ketone (MEK). The remaining 200 ml solvents are added to the round bottom flask. The reaction is performed as in Example 1 whereby 50 ml of the solvent-/monomer/initiator mixture is added to the reaction flask followed by addition of the rest by dripping at a constant rate via an additional funnel. The resulting copolymer is separated by evaporation of the xylene and MEK. DMTA analysis identified $T_g$ as 80° C. and the softening temperature as 40° C. The molecular weight is estimated to be 17,000 g/mol based on the total moles monomer and initiator. The monofunctional isocyanate is prepared by reacting the diisocyanate, isophorone diisocyanate (IPDI) with a monomethyl polyether, polyethylene glycol methyl ether, formula weight 164.2 g/mol, in a 1:1 molar ratio overnight at room temperature in the presence of 60 µl dibutyl tin diacetate. The resulting monoisocyanate is added to a THF solution of the hydroxy functionalized methacrylic copolymer in an amount to completely react all hydroxy functionality and allowed to react for 12-24 hours at room temperature. Following this reaction, lithium trifluoromethane sulfonate is added and stirred until all of the salt had dissolved giving a 5:1 etheric oxygen:lithium ion molar ratio. The solvent is removed by heating under mild vacuum conditions. This sample is plasticized by addition of 50% by weight propylene carbonate/lithium triflouromethanesulfonate solution at a 10/1 weight ratio. By this procedure, a material with the desired mechanical and electrical properties is obtained.

EXAMPLE 3

The reaction vessel is assembled as in Example 1.25 g styrene, 43 g butyl methacrylate, 30 g hydroxyethyl acrylate, 2 g acrylic acid, and 0.1 g t-butylperbenzoate are added to a 300 ml portion of deaerated methyl amyl ketone (MAK). The remaining 200 ml MAK is added to the round bottom flask. The reaction is performed as in Example 1. The resulting copolymer is separated by evaporation of the MAK. The copolymer $T_g$ is substantially below room temperature. The molecular weight is estimated to be 85,000 g/mol based on the total moles monomer and initiator. The monofunctional isocyanate is prepared by reacting a large excess of the diisocyanate, 2,4-toluene diisocyanate with the monomethyl polyether, polyethylene glycol methyl ether, formula weight 550 g/mol, overnight at room temperature in the presence of 60 µl 1,4-diazobicyclo[2.2.2]octane, DABCO. The resulting monoisocyanate is dissolved in THF and separated from the excess free diisocyanate by passing the solution through a neutral alumina column. The purified monoisocyanate is added to a THF solution of the hydroxy functionalized methacrylic copolymer in an amount to completely react all hydroxy functionality and is allowed to react for 12–24 hours at room temperature. Following this reaction, sodium p-toluenesulfonate is added and stirred until all of the salt had dissolved giving a 10/1 etheric oxygen:lithium ion molar ratio. The solvent is removed by heating under mold vacuum conditions. By this procedure, a material with the desired mechanical and electrical properties is obtained.

EXAMPLE 4

The reaction vessel is assembled as in previous examples. 50 g methyl methacrylate, 20 g hydroxyethyl methacrylate, 30 g 1-octene, and 0.03 g cumene hydroperoxide are added to a 300 ml portion of deaerated mixture of 400 ml xylenes and 100 ml 1-butanol. The remaining 200 ml solvents are added to the round bottom flask. The free-radical polymerization reaction is performed as in the previous examples. The resulting copolymer is separated by evaporation of the polymerization solvents. The molecular weight is estimated to be 280,000 g/mol based on the total moles monomer and initiator. The monofunctional isocyanate is prepared by reacting the diisocyanate, isophorone diisocyanate (IPDI) with the monomethyl polyether, polyethyleneglycol methyl ether, formula weight 350 g/mol, in a 1:1.5 molar ratio overnight at room temperature in the presence of 60 µl dibutyl tin dilaurate. The resulting monoisocyanate is added to a THF solution of the hydroxy functionalized methacrylic copolymer in an amount to react 75% of all hydroxy functionality and allowed to react for 12–24 hours at room temperature. Following this reaction, sodium sulfate is added and stirred until all of the salt had dissolved giving a 15:1 etheric oxygen:lithium ion molar ratio. The solvent is removed by heating under mild vacuum conditions. This sample is plasticized by addition of 20% by weight tetraethylene glycol di-2-hexyladipate/lithium triflouromethane solfonate solution at a 10/1 weight ratio. By this procedure, a material with the desired mechanical and electrical properties is obtained.

EXAMPLE 4

The reaction vessel is assembled as in previous examples. 20 g methyl methacrylate, 50 g hydroxypropyl acrylate, 10 g styrene, 20 g vinyl alcohol, and 0.1 g AIBN are added to a 300 ml portion of deaerated mixture of 400 ml xylenes and 100 ml 1-butanol. The remaining 200 ml solvents are added to the round bottom flask. The free-radical polymerization reaction is performed as in the previous examples. Alternatively, the reaction may be performed without a polymerization solvent. The resulting copolymer is separated by evaporation of the polymerization solvents, unless the reaction was performed by a bulk polymerization. The molecular weight is estimated to be 85,000 g/mol based on the total moles monomer and initiator. The monofunctional isocyanate is prepared by reacting the diisocyanate, isophorone diisocyanate (IPDI) with the monomethyl polyether amine, polyethylene glycol methyl ether amine, formula weight 350 g/mol, in a 1:1.25 molar ratio overnight at room temperature in the presence of 60 µl dibutyl tin dilaurate. The resulting monoisocyanate is added to a THF solution of the hydroxy functionalized methacrylic copolymer in an amount to react all hydroxy functionality and allowed to react for 12–24 hours at room temperature. Following this reaction, lithium tetrafluoroborate is added and stirred until all of the salt had dissolved giving a 10:1 etheric oxygen:lithium ion molar ratio. The solvent is removed by heating under mild vacuum conditions. This sample is plasticized by addition of 20% by weight tetraethylene glycol di-2-hexyladipate/lithium salt solution at a 10/1 weight ratio. By this procedure, a material with the desired mechanical and electrical properties is obtained.

EXAMPLE 6

The reaction vessel is assembled as in previous examples. 20 g vinyl butyral, 10 g vinyl acetate, 20 g vinyl alcohol, 30 g hydroxypropyl methacrylate, 20 g methyl methacrylate, and 0.2 g AIBN are added to a 300 ml portion of deaerated mixture of 400 ml xylenes and 100 ml 1-butanol. The remaining 200 ml reaction solvent is added to the round bottom flask. The free-radical polymerization reaction is performed as in the previous examples. The resulting copolymer is separated by evaporation of the polymerization solvents, unless the reaction was performed by a bulk polymerization. The molecular weight is estimated to be 40,000 g/mol based on the total moles monomer and initiator. The monofunctional isocyanate is prepared by reacting a large excess of the diisocyanate, dexamethylene diisocyanate (HDI) with the monomethyl polyether thiol, polyethylene thiol methyl ether, formula weight 362 g/mol, overnight at room temperature in the presence of 60 µl dibutyl tin dilaurate. The resulting monoisocyanate is separated from the monoisocyanate/free diisocyanate mixture by high facuum distillation of the free HDI, dissolved in THF, and added to a THF solution of the hydroxy functionalized methacrylic copolymer in an amount to react 80% of the hydroxy functionality and allowed to react for 12–24 hours at room temperature. Following this reaction, lithium perchlorate is added and stirred until all of the salt had dissolved giving a 5:1 etheric oxygen:lithium ion molar ratio. The solvent is removed by heating under mild vacuum conditions. The acrylic polyether copolymer is then ground at low temperature to form a powder. A tetraethylene glycol di-2-hexyladipate/lithium salt solution at a 10/1 ratio is added in an amount of 32% by weight by milling and compounding with the copolymer powder. The final film is then extruded at elevated temperature to form the desired material.

We claim:

1. A thermoplastic ionic conductor composition comprising (i) a polymeric adduct having an acrylic backbone and polyether side chains, and (ii) an alkali metal salt, said polymeric adduct being made by reacting:
   (A) an hydroxy-functional acrylic copolymer (i) having a number average molecular weight Mn between about 2,000 and 500,000 and a Tg in the range of 0° C. and 100° C., and (ii) being made by copolymerizing ethylenically unsaturated monomers comprising at least 50% by weight monomers selected from acrylates and methacrylates wherein at least about 20% by weight of said ethylenically unsaturated monomers comprise hydroxy functional ethylenically unsaturated monomers; and (B) polyether monoisocyanate, wherein said acrylic copolymer and said monoisocyanate are reacted in amounts so as to provide between about 0.5 and about 1.0 reactive isocyanate groups per each hydroxyl functionality present on said acrylic copolymer.

2. The thermoplastic ionic conductor composition according to claim 1 wherein said polyether monoisocyanate is made by reacting isophorone diisocyanate with a mono-hydroxy functional polyether.

3. The thermoplastic ionic conductor according to claim 2 wherein said polyether contains at least three ether moieties independently selected from ($CH_2CH_2O$) and ($OCH_2CH_3CH$).

4. The thermoplastic ionic conductor according to claim 2 wherein said monoisocyanate is employed in an amount sufficient to react substantially all of the hydroxyl groups on said acrylic copolymer.

5. The thermoplastic ionic conductor composition according to claim 1 wherein said acrylic copolymer is made by free radical solution copolymerization of monomers selected from the groups consisting of hydroxypropyl methacrylate, methyl methacrylate, butyl methacrylate, hydroxyethyl methacrylate, and hydroxy ethyl acrylate in an organic solvent.

6. The thermoplastic ionic conductor according to claim 1 wherein said salt is selected from salts of sodium and lithium.

7. The thermoplastic ionic conductor according to claim 6 wherein said salt is selected from nitrates, chlorides, perchlorates, and sulfates of said sodium and lithium.

8. The thermoplastic ionic conductor according to claim 1 which further comprises plasticizer.

9. An electrochromic device comprising two substrates and therebetween: one electrode layer; and ion conductive layer; and electrochromic layer; and another electrode layer, at least one of said one electrode layer and said other electrode layer being transparent and each electrode layer being in contact with a respective one of said substrates, said ion conductive layer being adapted to communicate ions to and from said electrochromic layer upon application of a voltage across said electrode layers, wherein said ion conductive layer comprises a thermoplastic ionic conductor comprising (i) a polymeric adduct having an acrylic backbone and polyether side chains, and (ii) an alkali metal salt, said polymeric adduct being made by reacting:

(A) an hydroxy-functional acrylic copolymer (i) having a number average molecular weight Mn between about 2,000 and 500,000 and a Tg in the range of 0° C. and 100° C., and (ii) being made by copolymerizing ethylenically unsaturated monomers comprising at least 50% by weight monomers selected from acrylates and methacrylates wherein at least about 20% by weight of said ethylenically unsaturated monomers comprise mono-hydroxy functional ethylenically unsaturated monomers; and (B) polyether monoisocyanate, wherein said acrylic copolymer and said monoisocyanate are reacted in amounts so as to provide between about 0.5 and about 1.0 reactive isocyanate groups per each hydroxyl functionality present on said hydroxy-functional acrylic copolymer.

10. The electrochromic device according to claim 9 wherein said polyether is made by reacting isophorone diisocyanate with a mono-hydroxy functional polyether.

11. The electrochromic device according to claim 9 wherein said polyether contains at least two ether moieties independently selected from ($CH_2CH_2O$) and ($OCH_2CH_3CH$).

12. The thermoplastic ionic conductor composition according to claim 9 wherein said acrylic copolymer is made by free radical solution copolymerization of monomers selected from the groups comprising hydroxypropyl methacrylate, methyl methacrylate, butyl methacrylate, hydroxyethyl methacrylate, and hydroxy ethyl acrylate in an organic solvent.

* * * * *